(12) United States Patent
Levie et al.

(10) Patent No.: US 9,926,748 B2
(45) Date of Patent: Mar. 27, 2018

(54) MODIFIED TUBULAR WITH WIRELESS COMMUNICATION DEVICE

(71) Applicant: RSD2 HOLDING AG, Kastanienbaum (CH)

(72) Inventors: David E. Y. Levie, Kastanienbaum (CH); Richard Ronald Baynham, Marina de Ravenna (IT)

(73) Assignee: RSD2 HOLDING AG, Kastanienbaum (CH)

( * ) Notice: Subject to any disclaimer, the term of this patent is extended or adjusted under 35 U.S.C. 154(b) by 175 days.

(21) Appl. No.: 14/778,894

(22) PCT Filed: Apr. 9, 2013

(86) PCT No.: PCT/EP2013/057417
§ 371 (c)(1),
(2) Date: Sep. 21, 2015

(87) PCT Pub. No.: WO2014/146728
PCT Pub. Date: Sep. 25, 2014

(65) Prior Publication Data
US 2016/0047175 A1    Feb. 18, 2016

(30) Foreign Application Priority Data

Mar. 19, 2013   (GB) .................................. 1305017.4

(51) Int. Cl.
*E21B 17/00*  (2006.01)
*E21B 47/01*  (2012.01)
(Continued)

(52) U.S. Cl.
CPC .......... *E21B 17/006* (2013.01); *B29C 65/483* (2013.01); *B29C 66/532* (2013.01);
(Continued)

(58) Field of Classification Search
CPC ........ E21B 17/006; E21B 47/01; E21B 47/12; B29C 65/483; B29C 66/532;
(Continued)

(56) References Cited

U.S. PATENT DOCUMENTS 5,160,925 A    11/1992 Dailey et al.
5,767,674 A     6/1998 Griffen et al.
(Continued)

FOREIGN PATENT DOCUMENTS

WO    2005/100733 A1    10/2005
WO    2010/023476 A2     3/2010

OTHER PUBLICATIONS

Search Report from corresponding GB Application No. GB1305017.4 dated Sep. 16, 2014.
(Continued)

*Primary Examiner* — Carib A Oquendo
(74) *Attorney, Agent, or Firm* — Heslin Rothenberg Farley & Mesiti P.C.; Victor A. Cardona, Esq.

(57) ABSTRACT

An oil field tubular has a composite material housing within which is located one or more wireless communication devices with a charge storage device for powering the communication device(s). In a disclosed method of installing a wireless communication device upon an oilfield tubular, a prefabricated composite shell formed with an inner skin and outer skin forming an inner space for containing the wireless communication device is applied to a surface of the tubular so as to form a cavity between the surface of the tubular and the prefabricated composite shell, a bonding material is introduced to the cavity and bonding material is cured.

10 Claims, 2 Drawing Sheets

(51) Int. Cl.
  *E21B 47/12*    (2012.01)
  *B29C 65/48*    (2006.01)
  *B29C 65/00*    (2006.01)
  *B29K 101/00*   (2006.01)
  *B29K 105/00*   (2006.01)
  *B29L 23/00*    (2006.01)
  *B29L 31/34*    (2006.01)

(52) U.S. Cl.
  CPC .............. *E21B 47/01* (2013.01); *E21B 47/12* (2013.01); *B29K 2101/00* (2013.01); *B29K 2105/0097* (2013.01); *B29K 2715/003* (2013.01); *B29K 2995/0081* (2013.01); *B29K 2995/0089* (2013.01); *B29L 2023/00* (2013.01); *B29L 2031/3481* (2013.01)

(58) Field of Classification Search
  CPC ........ B29K 2101/00; B29K 2105/0097; B29K 2715/003; B29K 2995/0081; B29K 2995/0089; B29L 2023/22; B29L 2031/3481
  See application file for complete search history.

(56) References Cited

U.S. PATENT DOCUMENTS

| | | | |
|---|---|---|---|
| 7,159,654 B2* | 1/2007 | Ellison | ................. E21B 17/006 166/250.01 |
| 2009/0188675 A1 | 7/2009 | Bloom et al. | |
| 2011/0192598 A1 | 8/2011 | Roddy et al. | |
| 2011/0316542 A1 | 12/2011 | Frey et al. | |
| 2012/0186080 A1 | 7/2012 | Bilodeau et al. | |
| 2012/0186808 A1* | 7/2012 | Lively | ................. E21B 17/1028 166/241.6 |

OTHER PUBLICATIONS

International Search Report from corresponding International Application No. PCT/EP2013/057417 filed Apr. 9, 2013, completed on May 7, 2014.

* cited by examiner

MODIFIED TUBULAR WITH WIRELESS COMMUNICATION DEVICE

CROSS REFERENCE TO RELATED APPLICATIONS

This application is a national stage of PCT International Patent Application No. PCT/EP2013/057417 filed on Apr. 9, 2013, and published in English on Sept. 25, 2014 as WO/2014/146728 A2, which claims priority to GB Application No. 1305017.4 filed on Mar. 19, 2013, the entire disclosures of which are incorporated herein by reference.

BACKGROUND

Oil and gas reservoirs may be exploited by tapping the resources therein via wellbores. Drilling of wellbores may require drilling a considerable distance into the earth. Many oil & gas bearing formations are at sub-sea locations. The direction of drilling may vary from a vertical position to a horizontal position. The wellbore created by drilling may be stabilised by use of casing or lining or by other measures. Strings assembled from stands of tubular drill pipe with a formation material removal assembly at the lower end of the string are used to form boreholes by drilling, and to conduct other wellbore operations using tools and instruments deployed upon or incorporated in the drill string (otherwise known as a work string if no drilling bottom hole assembly is attached). Use of downhole telemetry (RFID, WIFI etc.) to locate and position instruments and tools is desirable.

SUMMARY

In this disclosure modified oilfield tubulars are described which enable real time data transmission. The oilfield tubulars are provided with composite material housings within which are located one or more communication devices with at least one charge storage device for powering the communication device(s). The charge storage devices may be re-chargeable by wireless induction technology which has the advantage that no electrical charging posts need be installed. The communication devices may be operatively associated with an antenna, for example a loop antenna. The antenna may be built into the communication device or provided as a separate component.

Modification of a tubular using a pre-fabricated composite material housing is disclosed herein.

In embodiments the oilfield tubulars, especially drill pipe, may be modified for telemetry communication by attachment of fibre-reinforced composite material housings containing a wireless communication device. These composite material housings may be positioned at an upset region of the tubular, for example at a tool joint such as a pin and box assembly.

In embodiments, a drill pipe or other downhole tubular has a fibre reinforced composite housing formed from a shell positioned and bonded to the drill pipe near or flush with a tool joint. The shell may be assembled from cooperating complimentary parts fixed around a tubular and bonded together. Keying components or fasteners may be employed to hold shell parts together as an assembly. In embodiments dowels may be inserted into edge recesses and bonded with an adhesive or bonding material. The configuration of the dowels and recesses may facilitate a press or snap fit for ease of assembly. The shell may be formed from corresponding half-shells, but in other embodiments more than two shell parts may be used to form the whole shell for example using three cooperating parts.

The shell may be secured to the tubular by injection of an adhesive resin or bonding material.

A wireless communication device may be located in a composite material housing shell during a lay-up procedure and secured within a bonding material, optionally being first enclosed within a protective sheath or foam form. The wireless communication device is operatively associated with a charge storage device, which may be charged or re-charged using a contactless system such as induction coil technology. A suitable antenna may be incorporated in the device or operatively associated therewith. Batteries (cells) and capacitors are representative of suitable charge storage devices.

In embodiments, the composite material housing provides at least one internal space for receiving a wireless communication device and an associated charge storage device for powering the wireless communication device. After positioning of these devices in the housing a foam layer or resin matrix may be utilised to protect the devices and hold the devices in position within the internal space. This may be achieved as part of a lay-up procedure. Thereby, the communication device is embedded in a secure protective environment within the composite material housing.

An embodiment comprises a drill pipe tubular with pin and box tool joint end parts, with a composite material housing positioned on a surface of the drill pipe tubular at a tool joint end part. The composite material housing may be located at the box joint end of a drill pipe tubular for example.

A composite material housing may be formed by a lay-up procedure. The composite material housing may be formed as a shell with an inner and outer skin defining at least one internal space. The shell has an exterior surface spaced from an interior surface, the latter in use facing a tubular to which the composite material housing is applied. The shell may have one or more internal walls.

The interior surface of the inner skin of the shell may be configured to provide a plurality of projections, curved ridges, a fish scale pattern or any other relief pattern for improved bonding to a tubular.

The whole or a substantial part of the exterior surface of the shell making up the composite material housing may be treated with wear resistant ceramics.

The shell may be formed from a composite material. The composite material may be a fibre-reinforced resin material (FRP/GRP/GFK type material). The resin material is a hardenable resin optionally including curing agents and curing modifiers. The resin may be self-curing, or provided in two components which harden when brought together. The two component system may be a matrix-forming (prepolymer) component and a hardener. Suitable resins include epoxy resins, polyurethanes and polyurea resins including blends or hybrids thereof, and other curable resin components including polyester or polyol or polyamine components. The curing of the resin may be controlled by use of amine curing agents such as polyetheramines. Other additives may be present.

The fibre-reinforced resin material may be surface treated before moulding of the shell. The fibre-reinforced resin material may have a ceramic particulate applied. The fibre-reinforced material may have a friction-modifying material applied. A combination of such surface treatments may be used. The surface treatment may be a surface modifying finish to an external surface of the moulded shell.

Additional particulate materials may be present within the bulk of the fibre-reinforced resin material. The particulates may be in bead form.

The shell may have at least one inlet for passage of flowable materials, such as bonding agents. The shell may be bonded to an external surface of a tubular. Bonding agents may be introduced into a void between the tubular and the shell by injection through the at least one inlet.

The shell may be temporarily located upon a tubular, prior to introducing bonding agents into the shell, using temporary fastenings so as to enclose a void between the tubular and the shell. The temporary fastenings may be a contact adhesive or releasable fasteners which may include ties, wires, straps, an adhesive tape and various combinations thereof.

The embodiments of the composite material housing and tubular modification process enable the installation and protection of wireless (c.f. "wifi" or Bluetooth®) communication devices on drill pipe tubulars or other downhole tubulars in order to relay downhole data in real time. Positioning of the communication devices at such regular short intervals, the spacing being determined by tubular length, provides a chain of communication in real time, which obviates or mitigates known communication signal deficiencies due to the difficulties faced in working at depth within a borehole.

The composite material housing may be formed from plurality of shells adapted to fit around a tubular to assemble a composite material housing around a portion of the tubular.

Embodiments of the composite material shells have external load bearing skins which surround an internal pressure resistant internal space. During the composite material layup process at least one communication device may be secured into the pressure resistant internal space. The shells may be double skinned having an external load-bearing skin and an internal surface adapted for bonding to a tubular. The load-bearing skin should be robust to withstand the typical contact forces and loads usually encountered by the type of tubular in the wellbore operation and resistant to abrasive effects encountered during run-in, drilling and pull out, including those of cuttings loaded circulating fluids (drilling mud).

Embodiments of the composite material housing shells may have at least one internal chamber adjacent to an edge for forming a joint with a similar shell. The internal chamber has sufficient capacity for receiving a bonding material to facilitate assembly with a corresponding edge of another composite material housing shell using dowels, whereby the dowels become fixed in the bonding material in the chamber.

The composite material housing shell may have one or more ports in an external surface for injecting bonding material. The chamber may have a wall separating it from the internal pressure resistant internal space. The composite material housing shell may have one or more ports in an internal surface for allowing overflow injected bonding material to pass out of the chamber to facilitate bonding of the composite material housing shell assembly to a tubular.

Embodiments incorporate the disclosed features individually or in a variety of combinations.

The accompanying drawings illustrate embodiments of components for use in modifying a tubular to accommodate communication devices and associated stored energy devices and antenna.

DETAILED DESCRIPTION OF EMBODIMENTS

Figure 1:
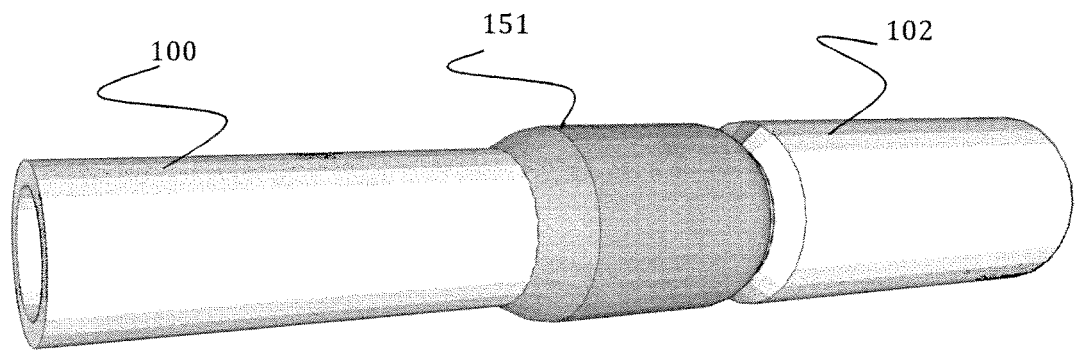
FIG. 1 shows a perspective side view of a tool joint box end of a drill pipe tubular with attached composite material housing adjacent to the joint.

Referring to FIG. 1 a drill pipe tubular 100 has a tool joint box end 102, adjacent to which is provided a composite material housing 151 for a communication device.

Figure 6:
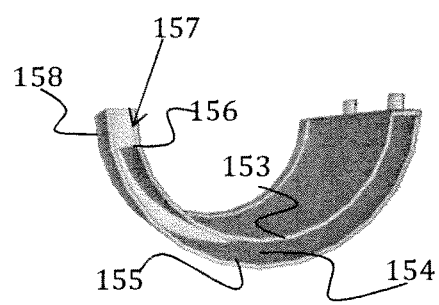
FIG. 6 shows a cutaway section through a composite material housing part shell with exposed dowel ends; and revealing the double skin of the shell
Figure 7:
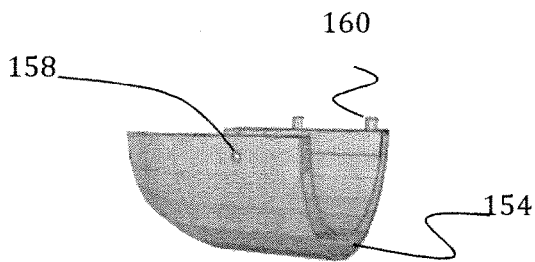
FIG. 7 shows a cutaway section through a composite material housing part shell with exposed dowel ends from an another angle.
Figure 8:
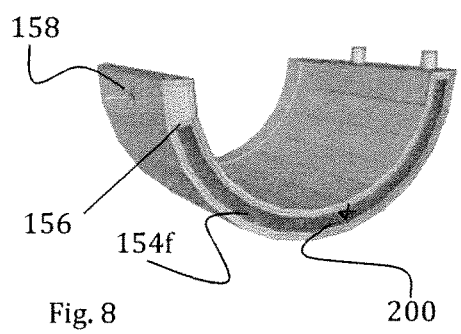
FIG. 8 shows a cutaway section through the composite material housing part shown in FIG. 6 and in which a filler material between the double skin is illustrated.
Figure 9:
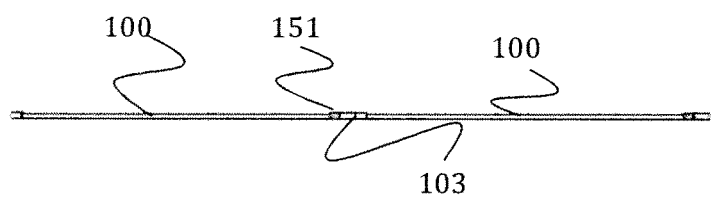
FIG. 9 shows side view of connected drill pipe tubulars with assembled composite material housings at the tool joints.

Such a composite housing 151 can be formed from a composite material housing shell part as shown in FIGS. 2-5. The composite housing 151 can be manufactured by a lay-up procedure and moulded to form a double skinned shell as illustrated in FIGS. 6-8. The double skinned shell has an inner concave surface 152 upon an inner skin 153 and an outer convex surface 156 upon an outer skin 155. A gap or inner space 154 is defined between the inner skin 153 and the outer skin 155. The inner space 154 is pressure and fluid resistant.

A wall 156, as shown in FIG. 6, separates the inner space 154 from a chamber 157 intended to receive a bonding material. An external port 158 on the outer skin 155 is provided for injection of bonding material into the chamber 157. An internal port 159 on inner skin 153 admits overflow of bonding material from the chamber 157 for the purpose of bonding the composite material housing 151 to a drill pipe tubular 100.

The composite material housing 151 is structurally robust and withstands anticipated mechanical loads and abrasive contacts. Typically, the composite material housing 151 is formed from two corresponding half shells.

Figure 2:
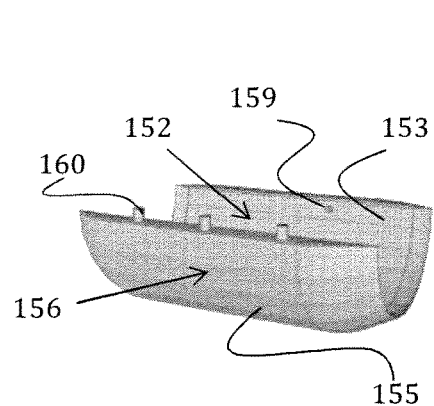
FIG. 2 shows a perspective side view of a composite material housing part shell with exposed dowel ends for engaging a corresponding shell provided with insertion holes for the exposed dowel ends.
Figure 3:
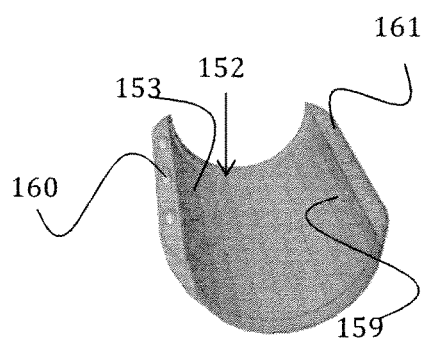
FIG. 3 shows a perspective end view of a composite material housing part shell as in FIG. 2.
Figure 4:
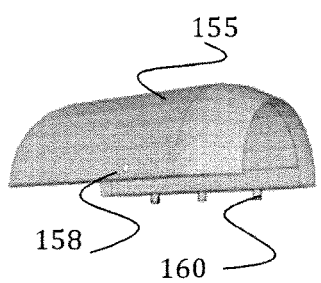
FIG. 4 shows an inverted view of the composite material housing part shell shown in FIG. 2
Figure 5:
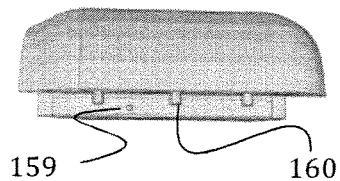
FIG. 5 shows a side view of a the composite housing part shell shown in FIG. 4.

Edges of the half shells are configured for fixing the half shells together to form the composite material housing 151. As illustrated in FIG. 2, one edge of one half shell has projecting dowels 160 to be inserted into corresponding holes 161 when two cooperating half shells are presented edge to edge to mate as part of an assembly procedure. In alternative embodiments the positioning of the dowels and receiving holes can be different. For example a first half shell may provide the projecting dowels 160 on both of its mating edges whilst a corresponding second half shell to be presented for mating with the first half shell has receiving holes 161 on its respective mating edges.

In an assembly procedure to locate the shell parts about the drill pipe tubular 100 to form the composite material housing 151, the half shells are presented one to the other with the drill pipe tubular in between, the dowels 160 are pressed home into the receiving holes 161, optionally in a snap fit to hold the half shells together. Bonding material is first injected through external port 158 into chamber 157 and fills it, thus securing the dowels 160. As further bonding material is injected, excess from the filled chamber 157 then flows out of internal port 159 into a recess between the drill pipe tubular and the inner concave surface 152 of the shell.

During the composite material lay-up process a communication device 200 with antenna, and an operatively associated electrical charge storage device to power the communication device is positioned in the inner space 154. The communication device and associated electrical charge storage device are optionally sheathed and secured in the inner space 154 using a foam layer 154f.

In the modification of the drill pipe tubular 100 to receive the composite material housing 151, an area of the tubular surface is prepared in order to give a clean, dry substrate with appropriate surface profile.

The composite material housing shells can be secured in position to the drill pipe tubular 100 using removable fixing straps and adhesive tape for example.

Suitable bonding material may be injected into shells through the ports in the shell.

When the bonding material is cured, fixing straps and adhesive tape should be removed and the installation inspected.

Positioning of a composite material housing at a tool joint 103 between successive tubulars 100 in a stand or string allows use of a wireless relay transmission of data between the communication devices one to the next in respective composite material housings.

A suitable bonding material may be a silane-modified A component for maximum adhesion, with nanomer and nanotube fillers with a resin matrix modified for tear strength and shock resistance, and fast cure.

The shells may be formed from any suitable composite material. The composite material may be a fibre-reinforced resin material (FRP/GRP/GFK type material). The resin material may be a hardenable resin optionally including curing agents and curing modifiers. The resin may be self-curing, or provided in two components which harden when brought together. The two component system may be a matrix-forming (pre-polymer) component and a hardener. Suitable resins include epoxy resins, polyurethanes and polyurea resins including blends or hybrids thereof, and other curable resin components including polyester or polyol or polyamine components. The curing of the resin may be controlled by use of amine curing agents such as polyetheramines. Other additives may be present.

The fibre-reinforced resin material may be surface treated before moulding of the shell. The fibre-reinforced resin material may have a ceramic particulate applied. The fibre-reinforced material may have a friction-modifying material applied. A combination of such surface treatments may be used. The surface treatment may be a surface modifying finish to an external surface of the moulded shell.

Additional particulate materials may be present within the bulk of the fibre-reinforced resin material. The particulates may be in bead form.

The shell may have at least one inlet port for passage of flowable materials, such as bonding agents. The shell may be bonded to an external surface of a tubular. Bonding agents may be introduced into a void between the tubular and the shell by injection through the at least one inlet port.

The shell may be temporarily located upon a tubular, prior to introducing bonding agents into the shell, using temporary fastenings so as to enclose a void between the tubular and the shell. The temporary fastenings may be a contact adhesive or releasable fasteners which may include ties, wires, straps, an adhesive tape and various combinations thereof.

Manufacture of Composite Material Housing Shell:

In an embodiment, a permanent mould or form is designed and constructed according to shape requirements for the shell form to be manufactured, that is, the geometry required for the intended composite material housing for a communication device. The shape requirements are derived from known dimensions of a tubular and its intended use in a wellbore. In embodiments the housing is sized to merge into or within the OD of an upset region of a tubular such as a tool joint.

The mould is used to form materials into a prefabricated shell which is suitable to form part of a composite material housing for a communication device which is to be provided on a tubular.

In an embodiment of a lay-up procedure, a fibre mat is infused with a resin matrix. This is achievable by passing the fibre mat through a bath containing the resin matrix. Infusion may also be achievable in other ways, such as applying the resin matrix liberally to the fibre mat by pouring or spraying or by a pressure treatment to soak, or impregnate the fibre mat with the resin matrix.

Ceramic particulates, for example hard wearing materials such as a combination of zirconium dioxide and silicon nitride, optionally in bead form, may be applied to the resin matrix infused fibre mat.

A friction modifying material such as fluorocarbon particulates providing a low friction coefficient also may be applied to the resin matrix infused mat.

The resin matrix infused fibre mat may be introduced to the mould such that surfaces treated with the aforesaid particulates are adjacent to the mould surfaces. Multiple additional layers of the resin matrix infused fibre mat, which may or may not each have been treated with particulates, may be laid up into the mould on to the first resin matrix infused fibre mat lining the mould until a predetermined thickness is attained. During this lay-up procedure a sheathed wireless communication device can be positioned amongst the resin matrix infused fibre mat, optionally enclosed in a foam layer.

Then the mould may be closed.

A resin filler matrix may be introduced into the mould using a low pressure resin transfer moulding process. In an example of such a process, a mixed resin and catalyst or resin curing agent are introduced, for example by injection, into a closed mould containing a resin matrix infused fibre and particulates lay-up. In this way a composite shell may be formed.

The mould may be heated in order to achieve first cure.

After sufficient curing of the resin to permit handling of the shell, the mould can be opened and the formed shell removed.

If necessary a post cure of the formed shell may be carried out. Post cure may be a heat treatment, for example conducted in an oven.

Variations, modifications of the disclosed embodiments contemplated by the person skilled in the field are within the scope of the disclosure, and with regard to scope, attention is directed to the following claims which form part of the present disclosure and extend to all equivalents of the disclosed subject matter.

The invention claimed is:

1. An oilfield tubular comprising:
   at least one wireless communication device in a composite material housing bonded to the oilfield tubular;

wherein the composite material housing comprises a prefabricated shell and a cured bonding material;

wherein the prefabricated shell comprises an inner and outer skin defining at least one internal space, the at least one wireless communication device being retained in said at least one internal space; and wherein the prefabricated shell comprises a chamber for receiving the bonding material, and a wall that separates the inner space from the chamber, and wherein an external injection port is provided on the outer skin to admit the bonding material into the chamber and wherein an internal port is provided on the inner skin for admitting the bonding material between the prefabricated shell and the oilfield tubular.

2. The oilfield tubular as claimed in claim 1, wherein the prefabricated shell is formed from a composite material and the prefabricated shell comprises at least one particulate surface wherein particulate materials provide the particulate surface with at least one of the following properties: surface abrasion resistance properties and low friction coefficient properties.

3. The oilfield tubular as claimed in claim 2, wherein the particulate surface comprises particulate materials selected from the group consisting of ceramic particles and friction reducing fluorocarbon particulates.

4. The oilfield tubular as claimed in claim 2, wherein the particulates are bonded into a resin matrix.

5. The oilfield tubular as claimed in claim 2, wherein the prefabricated shell comprises ceramic beads on at least one outer surface thereof.

6. The oilfield tubular as claimed in claim 5, wherein the ceramic beads comprise zirconium dioxide and silicon nitride.

7. The oilfield tubular as claimed in claim 1, wherein the wireless communication device is embedded in a retaining medium selected from the group consisting of a foam layer, and a resin-infused fibre mat.

8. The oilfield tubular as claimed in claim 1, wherein the wireless communication device is sheathed.

9. The oilfield tubular as claimed in claim 1, wherein the prefabricated shell is formed from a composite material and the prefabricated shell comprises at least one particulate surface wherein particulate materials provide the particulate surface with at least one of the following properties: surface abrasion resistance properties and low friction coefficient properties.

10. A method of installing a wireless communication device upon an oilfield tubular comprising forming a prefabricated composite shell having an inner and outer skin with an inner space, the inner space containing the wireless communication device embedded in a retaining medium selected from a foam layer, and a resin-infused fibre mat, applying the prefabricated composite shell to a surface of the tubular so as to form a cavity between the surface of the tubular and the prefabricated composite shell, wherein the prefabricated shell comprises a chamber for receiving the bonding material, and a wall that separates the inner space from the chamber, and wherein an external injection port is provided on the outer skin to admit the bonding material into the chamber and wherein an internal port is provided on the inner skin for introducing bonding material to the cavity and curing the bonding material.

* * * * *